J. W. H. GRIFFIN.
CAR FENDER.
APPLICATION FILED MAY 1, 1920.
1,400,052.
Patented Dec. 13, 1921.
2 SHEETS—SHEET 1.
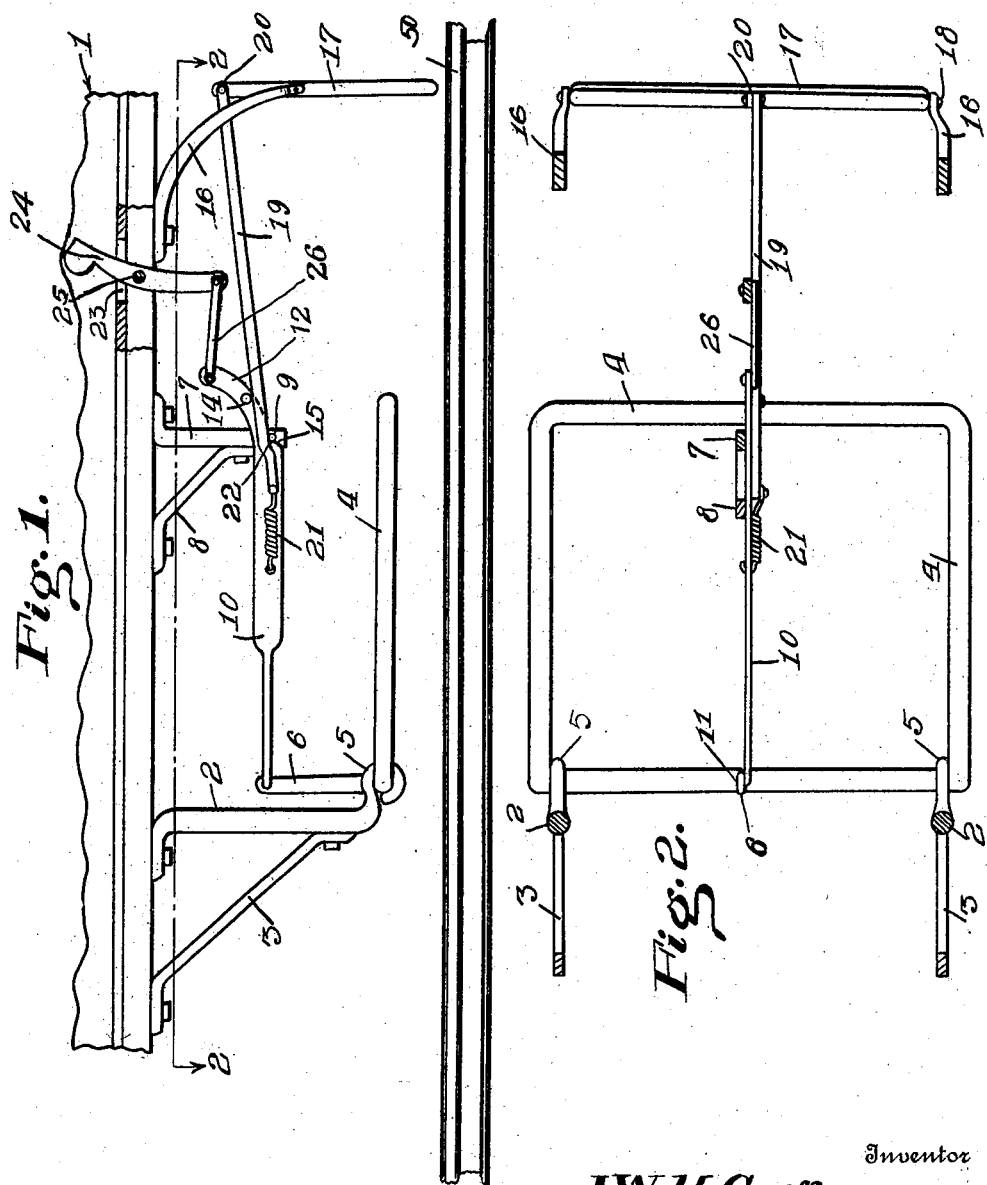
Witness
Inventor
J.W.H.Griffin.
By C.A.Snow & Co.
Attorneys

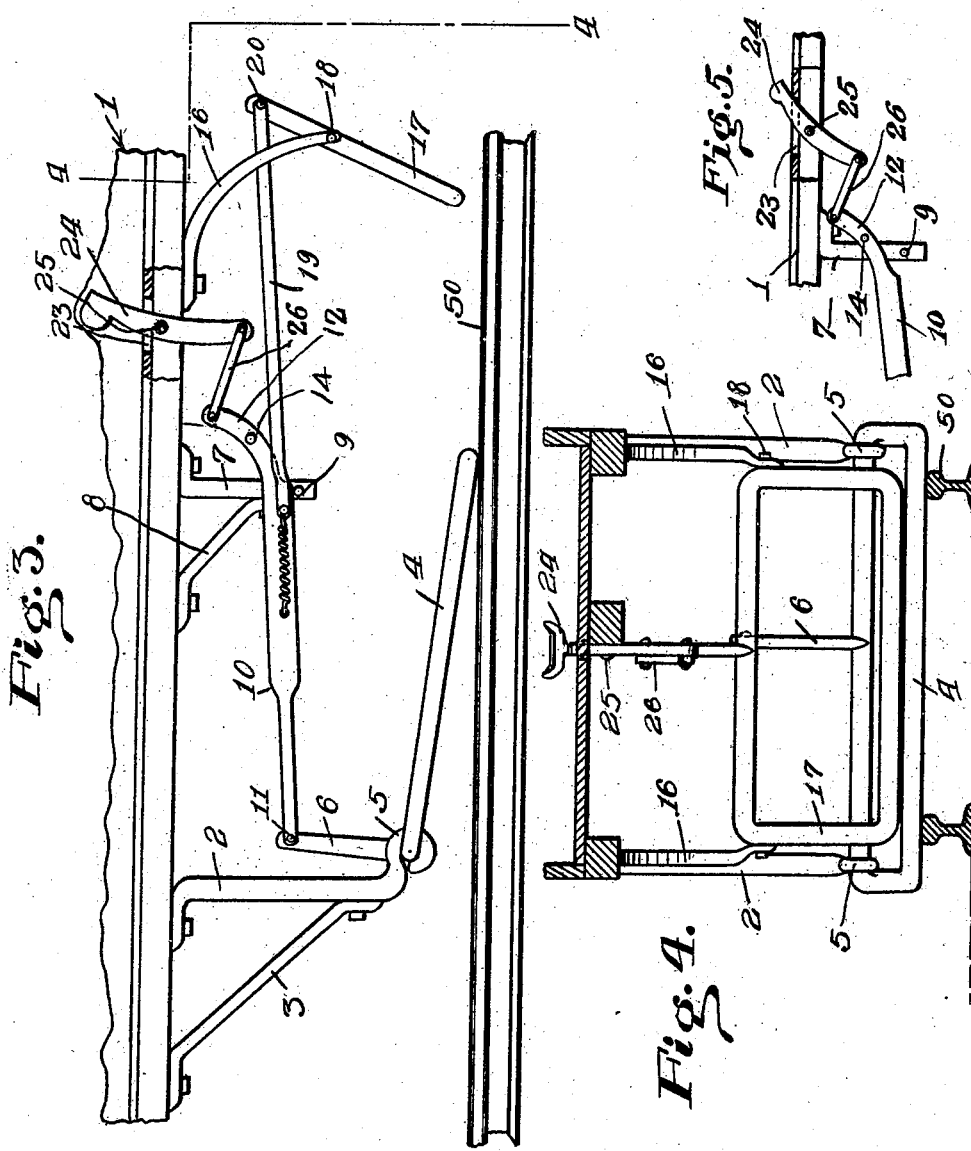

UNITED STATES PATENT OFFICE.

JAMES W. H. GRIFFIN, OF ALTONA, MICHIGAN.

CAR-FENDER.

1,400,052.

Specification of Letters Patent. Patented Dec. 13, 1921.

Application filed May 1, 1920. Serial No. 378,283.

*To all whom it may concern:*

Be it known that I, JAMES W. H. GRIFFIN, a citizen of the United States, residing at Altona, in the county of Mecosta and State of Michigan, have invented a new and useful Car-Fender, of which the following is a specification.

It is the object of this invention to provide novel means whereby a fender on a car or other vehicle may be lowered automatically when an obstacle is encountered, means being provided whereby the fender may be lowered at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, the fender being elevated; Fig. 2 is a section taken on the line 2—2 of Fig. 1; Fig. 3 is an elevation similar to Fig. 1 but showing the fender lowered; and Fig. 4 is a transverse section taken approximately on the line 4—4 of Fig. 3, the view being for the most part, in the nature of an end elevation.

Fig. 5 is a fragmental side elevation showing the pedal in an intermediate position.

The numeral 1 denotes a car body carrying hangers 2 supported by braces 3. A fender 4 is pivotally supported at 5 in the hangers 2 and has an upstanding arm 6. The car body carries a bracket 7 supported by a brace 8. A pin or support 9 projects laterally from the bracket 7. A locking bar 10 is pivoted at 11 to the arm 6 and is slidably mounted on the support or pin 9. The locking bar 10 has an upstanding forward end 12 provided with a lateral projection 14. In the lower edge of the locking bar 10 there is a shoulder 15 adapted to coöperate with the pin or support 9 to hold the fender 4 elevated, as shown in Fig. 1.

Depending arms 16 are mounted on the car body 1. An apron 17 is pivotally mounted, intermediate its ends, as shown at 18, on the arms 16. The forward end of a connection 19 is pivoted at 20 to the upper portion of the apron 17. The rear end of the connection 19 is united by a retractile spring 21 with the locking bar 10. The connection 19 is provided with an inclined part 22 adapted to coöperate with the pin 9, the connection being mounted for sliding movement on the pin. The projection 14 on the forward end 12 of the locking bar 10 overhangs the connection 19.

In the bottom of the car body 1 an opening 23 is formed. A pedal 24 is located in the opening and is pivotally supported on the car body as shown at 25. A link 26 connects the lower end of the pedal 24 with the end 12 of the locking bar 10.

When the fender 4 is elevated, as shown in Fig. 1, the shoulder 15 on the locking bar 10 engages with the support 9 to hold the fender elevated. When an obstacle is encountered, the lower end of the apron 17 swings rearwardly, the connection 19 moves forwardly, the inclined part 22 of the connection coöperating with the pin 9 to raise the connection. When the connection is raised, the locking bar 10 is raised also, because the projection 19 on locking bar overhangs the connection. Thus, the shoulder 15 is disengaged from the pin 9. The fender 4 then drops into engagement with the rails 50, as shown in Fig. 3. The spring 21 reacts on the connection 19, to swing the upper end of the apron 17 backwardly from the position of Fig. 3, until the inclined part 22 of the connection coöperates again with the pin 9. Then fender 4 may be raised readily, by hand or otherwise, the arm 6 drawing the locking bar 10 rearwardly until the shoulder 15 on the locking bar engages with the pin 9, to hold the fender 4 elevated as delineated in Fig. 1. At any time the operator may drop the fender 4 by pushing the upper end of the pedal 24 forwardly into the position of Fig. 5, and then releasing the pedal, so that the pedal assumes the position shown in Fig. 3. When the pedal is moved into the position of Fig. 5, the bar 10 is raised above the pin 9, and when the pedal is released, the bar 10 moves forwardly, and is supported on the pin 9, as shown in Fig. 3.

Having thus described the invention, what is claimed is:—

1. In a device of the class described, a car; a fender pivoted thereto and having an upstanding arm; a support on the car; a locking member mounted on the support for sliding movement and pivoted to the arm, the locking member having a shoulder adapted to engage with the support to hold the fender elevated; an apron mounted to swing on the car; a connection pivoted to the apron and mounted for sliding movement on the support, the connection having an inclined part coöperating with the support to disengage the shoulder therefrom when the connection is advanced by the swinging movement of the apron; and means for uniting the connection with the locking member.

2. In a device of the class described, a car; a fender pivoted thereto and having an upstanding arm; a support on the car; a locking member mounted on the support for sliding movement and pivoted to the arm, the locking member having a shoulder adapted to engage the support; an apron mounted to swing on the car; a connection pivoted to the apron and mounted for sliding movement on the support, the connection having an inclined part coöperating with support; a spring uniting the connection with the locking member; and a projection on the locking member, the projection overhanging the connection.

3. In a device of the class described, a car; a fender pivoted thereto and having an upstanding arm; a support on the car; a locking member mounted on the support for sliding movement and having a shoulder adapted to engage with the support to hold the fender elevated; an apron mounted to swing on the car; a connection pivoted to the apron and mounted for sliding movement on the support, the connection having an inclined part coöperating with the support, the connection and the locking member being interengaged to effect a lifting of the locking member and a disengagement of the shoulder from the support when the connection is advanced by the swinging movement of the fender; and a spring uniting the connection with the locking member.

4. A device of the class described, constructed as set forth in claim 1 and further characterized by the provision of means under the control of an operator for moving the locking member to disengage the shoulder from the support.

5. A device of the class described, constructed as set forth in claim 3 and further characterized by the provision of means under the control of an operator for actuating the locking member to disengage the shoulder from the support.

6. In a device of the class described, a car; a fender pivoted thereto and having an upstanding arm; a support on the car; an apron mounted for swinging movement on the car; coöperating elements comprising a connection pivoted to the apron, and a locking member pivoted to arm, both of said coöperating elements being slidably mounted on the support, the locking member being provided with a shoulder coacting with the support to hold the fender elevated, and the connection having an inclined part coacting with the support, one of said coöperating elements having a projection engaged with the other of said coöperating elements, to effect a lifting of the locking member and a disengagement of the shoulder from the support when the connection is advanced by the swinging movement of the fender.

In testimony that I claim the foregoing as my own, I have hereto affixed my signature in the presence of two witnesses.

JAMES W. H. GRIFFIN.

Witnesses:
HERMAN P. HUGENHOLTZ,
ARTHUR APSEY.